(12) United States Patent
Kemmler et al.

(10) Patent No.: US 8,869,069 B2
(45) Date of Patent: *Oct. 21, 2014

(54) METHOD FOR SELECTING ONE OR MORE FUNCTIONS OF AN IMPLEMENTATION GUIDE

(75) Inventors: Andreas Kemmler, Boenigheim (DE); Torsten Kamenz, Weisloch (DE)

(73) Assignee: SAP SE, Walldorf (DE)

(*) Notice: Subject to any disclaimer, the term of this patent is extended or adjusted under 35 U.S.C. 154(b) by 136 days.

This patent is subject to a terminal disclaimer.

(21) Appl. No.: 13/303,937

(22) Filed: Nov. 23, 2011

(65) Prior Publication Data
US 2012/0131467 A1    May 24, 2012

Related U.S. Application Data

(63) Continuation-in-part of application No. 12/952,688, filed on Nov. 23, 2010, now Pat. No. 8,473,867.

(30) Foreign Application Priority Data

Nov. 15, 2011 (EP) .................................... 11189119

(51) Int. Cl.
| | |
|---|---|
| G06F 15/00 | (2006.01) |
| G06F 13/00 | (2006.01) |
| G06Q 10/10 | (2012.01) |
| G06F 9/44 | (2006.01) |
| G06Q 10/06 | (2012.01) |

(52) U.S. Cl.
CPC ............... *G06Q 10/06* (2013.01); *G06Q 10/10* (2013.01); *G06F 8/38* (2013.01)
USPC .......................................... 715/853; 715/851

(58) Field of Classification Search
CPC ................................ G06Q 10/06; G06F 13/10
USPC ............... 715/851–853, 763–765, 734–736, 715/840–841, 741
See application file for complete search history.

(56) References Cited

U.S. PATENT DOCUMENTS

| | | | | |
|---|---|---|---|---|
| 6,731,625 B1* | 5/2004 | Eastep et al. | ................... | 370/352 |
| 6,826,616 B2* | 11/2004 | Larson et al. | ................. | 709/228 |
| 2006/0026586 A1 | 2/2006 | Remmel et al. | | |
| 2008/0095339 A1* | 4/2008 | Elliott et al. | ............... | 379/93.01 |

OTHER PUBLICATIONS

Weiss, Thomas, "Industry Solutions Are Now Integrated into the SAP ERP Core," SAP Insider, Dec. 2008.

* cited by examiner

*Primary Examiner* — Cao "Kevin" Nguyen
(74) *Attorney, Agent, or Firm* — Kenyon & Kenyon LLP

(57) ABSTRACT

A computer-implemented method for selecting one or more functions for display is provided. The selection may be performed via an implementation guide that is a hierarchy comprising nodes. A node may represent one function. The method may comprise retrieving a first list of switches in response to selection of a function, extracting one or more switches from the first list such that the extracted switches include function switches and/or conflict switches, determining whether each of the extracted switch is an active conflict switch and, if yes, adding the active conflict switch to a second list of switches. After removing all switches from the first list or having added all of them to the second list, the method processes the second list to determine which functions can be executed on the processor without conflicts and presenting a function GUI element representing a function determined to be executable without conflicts.

20 Claims, 10 Drawing Sheets

100

200

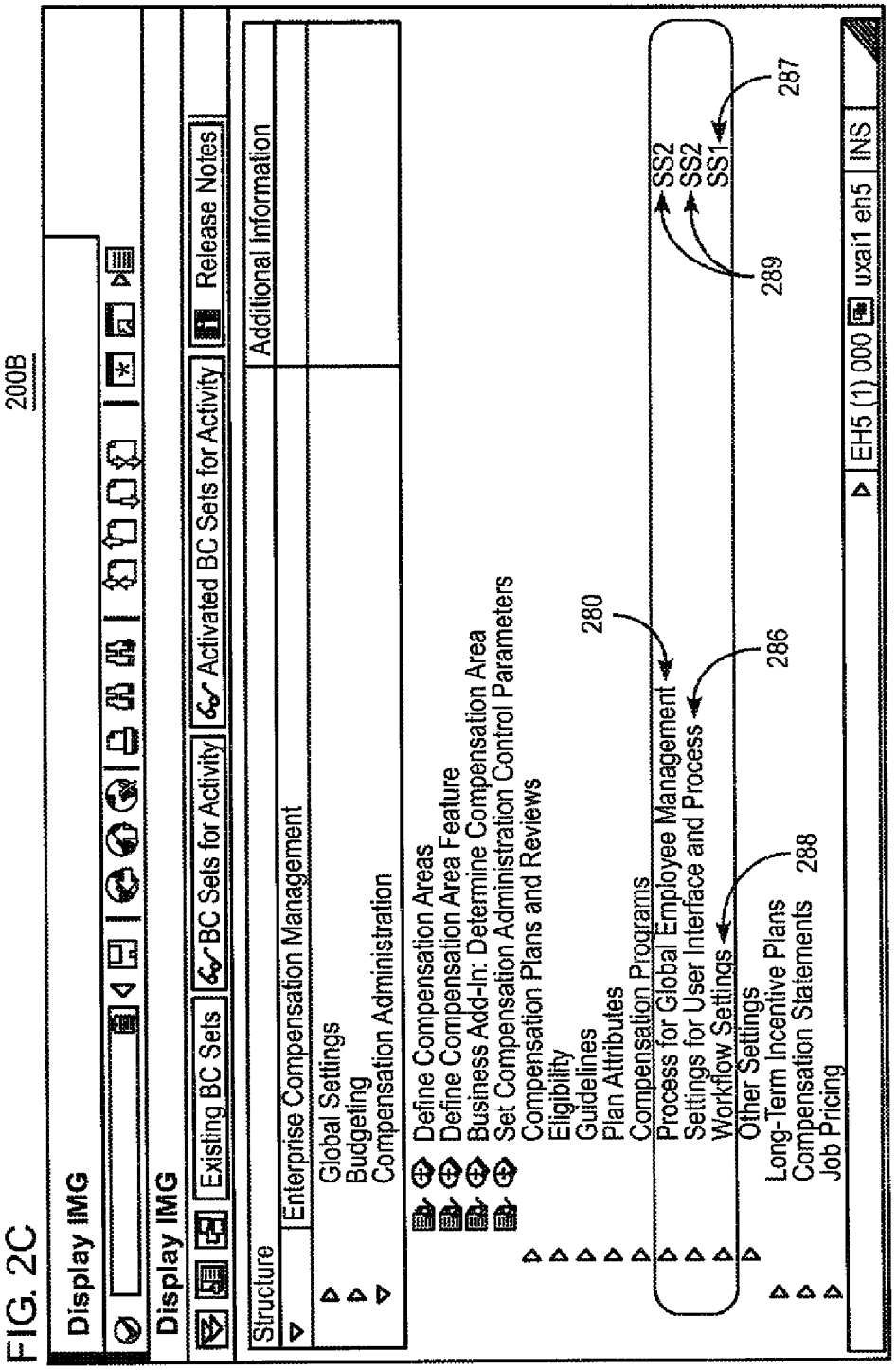

300

400

METHOD FOR SELECTING ONE OR MORE FUNCTIONS OF AN IMPLEMENTATION GUIDE

CROSS-REFERENCE TO RELATED APPLICATIONS:

This application is a continuation in part of U.S. application Ser. No. 12/952,688, filed Nov. 23, 2010 (pending), and also claims priority to the European Patent Application No. 11 189 119.8., filed Nov. 15, 2011, the contents of both applications are incorporated herein by reference.

FIELD OF THE INVENTION

Background and Related Art

Enhancement packages are software packages used to provide updated computer application functionality and features to a user of a particular computer application, such as an enterprise resource management system or customer relationship management system.

Using current systems, a user can choose when to roll out a particular computer application function. For example, in an enhancement package that is used by a number of departments within an entity, a human resources department of the entity may activate computer application functions provided in the enhancement package immediately, while an accounting department of the entity may delay activation of accounting functionality until a later date, e.g., after the end of the fiscal year. The information technology (IT) administrator, for example, can perform the activation steps for the particular department.

Enhancement packages are provided to a customer, such as a manufacturing entity or services entity. A group of data structures identifying the functions and computer objects that provide the functions are typically delivered with the computer code. The computer code and the group of data structures may be installed on the entity's computer system. A portion of the data structures may arrange in a hierarchical fashion the numerous functions that are part of the computer application enhancement. The hierarchy may be configured in the commonly known trunk, branch, node, and leaf structure. The nodes in the hierarchy may have assigned computer objects, which may be assigned in particular to the leaf nodes of said data structure. Said computer objects comprise or are responsible for making available and executing a particular function. This particular data structure may be called an implementation guide. Some of the nodes of said implementation guide may be represented by GUI elements and displayed on a display device, e.g., a screen. A purpose of the implementation guide is to allow easy indication of the enhancement package functions currently selected and available for execution. The selection may be in particular performed by users such as an IT administrator who may select the computer application functions his employee requires. In order to maintain computer application configuration management integrity as enhancement packages are introduced, changes to the implementation guide should reflect only changes to a computer application function. The function selection may change the kind and sequence the corresponding computer objects are executed. The hierarchy, when presented in a graphical user interface, allows a user to see which computer objects are affected by the selection of a particular node or leaf within the hierarchy. For example, when a department of an entity may want to implement a new computer application function provided with the installed enhancement package, a function specific to the particular department may be selected.

FIG. 1 illustrates a graphical representation of the operation of a tool for facilitating use of the implementation guide for selection of a computer function. In FIG. 1, a tool 100 presents in a graphical user interface a list of functions 110 included in the latest enhancement package and any functions that have been installed to the computer system. The user may select a function to be implemented by selecting the function in a graphical user interface by, for example, selecting a check box with an input device (e.g., mouse or keyboard) that sets an indication (e.g., inserts a checkmark) when selected by the user. As the selections are made, the graphical user interface will cause switches 1, 3 and 5 in a switch framework 120 to be activated. The selected functions may be implemented by nodes, e.g., specific computer function XYZ, or enterprise computer function ABC, and/or specific computer-implemented functions for management or recruiting tasks. Note that more than one node, and more than one 'leaf node' or 'leaf' may be selected. The activated switches 1, 3 and 5 may allow for activation or deactivation of the associated computer objects 150, 152, 154, 156, 158 and 160 in the list of computer objects 150 that implement the selected functions.

However, given the complex nature of an enterprise-wide computer application, the selection of particular nodes (including the leaf nodes) may cause conflicts with other nodes. For example, a selection of a computer object on one node may call for a software module that performs an operation that is an opposite operation performed by another computer object that has been selected by the user. In this case, the two computer objects and corresponding functions are said to "conflict." The tool 100 may present to the user both functions even though the switches conflict.

For example, FIG. 2 illustrates a table for explaining the problem resulting from conflicting computer objects. Structure nodes (e.g. NODE 1 and NODE 2) and activities may be assigned to software switches e.g., S1 and S2, that include settings that can define how the nodes/activities may react depending upon the state (e.g., on or off separately, or both on or off simultaneously) the switches S1 and S2 are in after a particular selection. It may be possible to assign more than one switch to the same implementation guide node/activity. When two or more switches are assigned to the same implementation guide node/activity, the probability of the possible reactions to the switch state causing a conflict increases. A data structure accessible by a processor may be maintained in a data storage that tracks the assignment of particular function switches to nodes or sub-nodes and vice versa. In FIG. 2, the different combination of settings for each switch and resulting reactions at the respective nodes are shown in rows 210-240. In the illustrated example, possible reactions are 'hide' and 'show', which means the node/activity associated with the particular switch may, respectively, either be hidden (hide) from view in the user interface, or visible (show) on the user interface based on the switch setting. For example, in row 210, the switches S1 and S2 are both in a switched OFF state, and the assigned nodes NODE 1 and NODE 2, respectively, are both "HIDDEN." Rows 220 and 230 show the reactions related to the respective nodes, NODE 1 and NODE 2, when switch S1 is on and switch S2 is off, and when switch S1 is off and switch S2 is on. Switches with the reaction "VISIBLE" (i.e., show) override all switches that have the reaction "hide." In other words, one switch may cause a node to be visible and the other may cause a node to be hidden. In that case, the switch with the reaction to "show" will override the switch with the reaction to "hide." In more detail, consider the situation shown in FIG. 2:

Structure nodes NODE1 and NODE2 are sibling nodes within an implementation guide hierarchy because in the enhancement package, NODE2 is semantically a full replacement of NODE1. When the enhancements in the enhancement package are implemented, NODE2 is intended to replace NODE1.

Structure node NODE1 is assigned to switch S1 with reaction 'show' when switch S1 is switched on, and a reaction 'hide' when switch S1 is off. This means a graphical representation of NODE1 should be hidden when switch S2 is switched on (reaction 'hide' for NODE1) because switch S2 displays the new replacement structure node NODE2. But as mentioned above, a problem is that it is not possible to hide the graphical representation of NODE1 with switch S2 when S1 is switched on. This is because reaction 'show' has been predetermined in the system to "win" over the reaction 'hide'. As a result, graphical representations of both nodes NODE1 and NODE2 are presented (i.e., visible) to a user in the graphical user interface. The problem of conflicting computer objects (or conflicting functions thereof) in the implementation guide are typically resolved by the developers before a customer ever has the opportunity to make a conflicting selection. The developers typically implement a work around in the implementation guide to resolve the conflicts by assigning additional nodes.

To resolve the conflict, a developer may configure a "work around" to the implementation guide. For example, the developer may create a new node, say NODE3, in the implementation guide structure to address conflicting computer objects. The new node, say NODE3, may be assigned to switch S2 with a reaction to hide the graphical representation of NODE2 when switch S2 is on. NODE3 may also be the parent node of NODE1. NODE2 is also assigned to switch S2 with a reaction to show its graphical representation. By NODE3 being the parent of NODE1, this takes advantage of the rule that all children of a node take the same reaction as the parent. So if NODE3 is given the reaction to hide its graphical representation when switch S2 is on, NODE1 will also be hidden. When switch S2 is selected to be on, a graphical representation of NODE2 is visible and presented in the graphical user interface, and the graphical representations of NODE3 and its child, NODE1, are hidden.

The additional node (NODE3) and its corresponding graphical representation, without corresponding additional functions, can make the hierarchy of the implementation guide confusing because the additional node only addresses a specific conflict between two nodes. The confusion may be compounded by future enhancements that add further nodes that merely address node conflicts to the computer application. In addition, the configuration management protocols for the implementation guide may be compromised because changes to the implementation guide do not reflect only changes to a computer application function, but also include the switch workarounds.

An example shown in FIG. 2A illustrates a scenario in which a switch is activated and a computer function is presented in a screenshot 200A of a graphical user interface. A graphical user interface presents to a user the screenshot 200A displaying in a hierarchy graphical representations of the nodes of the implementation guide (IMG) for an exemplary enhancement package. Elements 272 and 274 graphically represent nodes in a hierarchical data structure at which the particular nodes "User Interface Settings" and "Work Settings" may be located. Also present in the data structure may be the switches that turn "on" or activate the particular computer functions indicated by the respective nodes. In the illustrated example, the switch 276 labeled "SS1" may be a switch that activates the particular computer functions represented by nodes "User Interface Settings" and "Work Settings." Depending upon the reaction ("show" or "hide") assigned to the particular state of switch 276 name "SS1", either node "User Interface Settings" 272 and "Work Settings" 274 may be presented in the graphical user interface 200A.

An example of a workaround as presented in a screenshot 200B of a graphical user interface is shown in FIG. 2B. The node "User Interface Settings" 284 may be, in the illustrated example, semantically replaced with the new functions at node "Settings for User Interface and Process" 286. In the workaround screenshot 200B, the nodes "Process for Global Employee Management" 280, "User Interface Settings" 284 and "Work Settings" 288 are assigned to switch SS1 287, while the workaround "User Interface Settings—General" 282 and semantic replacement "Settings for User Interface and Process" 286 nodes are assigned to switch SS2 289. In the illustrated example, the "Settings for User Interface and Process" 286 computer function may be a semantic replacement for the "User Interface Settings" 284 computer function. In this case, the present example illustrates the state of the implementation guide (IMG) when switch SS1 (element 287) is "on" and switch SS2 (element 289) is "off." The workaround inserts the node 282 entitled "User Interface Settings—General" in the hierarchy as a node above the "User Interface Settings" node 284. The node 282 (and implicitly node 284 which is a sub-node to node 282) may have the reaction "hide" assigned to it, and node 286 has the reaction "show" when the switch SS2 289 is switched "on."

FIG. 2C illustrates the effect of the workaround on the graphical user interface that displays the implementation guide to the user. In the screenshot 200C, when the state of the switches 287 and 289 are both switched to "on" respectively, the workaround may be effective (i.e., the semantic replacement "Settings for User Interface and Process" replaces "User Interface Settings", and the nodes 282 and 284 may be hidden. The user will be presented with a view as shown in FIG. 2C that presents nodes 280, 286 and 288 with the indication of the respective switches 287 and 289.

As can be seen in FIG. 2B, the "workaround" solution creates an additional node, e.g., 282, which based on its name, "User Interface Settings—General" is not very descriptive of the nodes true purpose. Furthermore, if and when additional nodes are required, other names must be given to those nodes further cluttering the implementation guide and masking the purpose of the presented nodes. Accordingly, the inventors have recognized the need for a tool that presents the implementation guide in a format absent of additional "work around" nodes that addresses the conflicting computer objects and satisfies the configuration management protocols of the implementation guide.

SUMMARY

It is an objective of the invention to provide for an improved method for selecting computer application functionality for implementation from an enhancement package and for a corresponding computer-readable storage medium and computer system. This object is solved by the features of the independent claims. Advantageous embodiments are given in the dependent claims.

An 'enhancement package' as used herein is a software package used to provide updated computer application functionality and features to a user of a particular computer application, such as an enterprise resource management system or customer relationship management system. According to embodiments, an enhancement package is structured such that a user can select which parts of the enhancement package the user wants to install or use after installation has occurred. As a result, both the installation of the enhancement package and the roll out of all of the updated computer application functions to the users do not have to occur substantially simultaneously. According to some embodiments, enhancement packages are be cumulative from a functional perspective, e.g., may contain the entire content of earlier packages. So each enhancement package may be based on the previous one. Enhancement packages may also have the same maintenance duration as the underlying core application. Each enhancement package may contain new versions of existing software components. With the enhancement packages customers can choose which software components are updated in their systems, depending on the new/extended functionality they want to use. In some embodiments it may be that new function must be explicitly switched on to become active/visible in the system. A functional unit within an enhancement package which can be activated/switched on may be referred to as a 'business function', 'functionality' or 'function'. The selection of a business function may trigger switches, which then may influence the execution of the code enhancements. These switches may ensure that customers only see, feel, or can make use of the new functionality if they have activated them. The activation process may additionally start a job in the overall system that automatically performs all the needed changes in the system.

A 'software switch' or 'switch' as used herein is a software implemented switching function for switching on or off the execution of a particular fragment of executable code that implements a function. According to embodiments, a switch may be implemented as any kind of stateful data structure or runtime object, i.e., a data structure runtime object having assigned the attribute value "active" or "inactive".

An 'implementation guide' as used herein is a hierarchical data structure at least some of whose nodes are represented by function GUI elements, each function GUI element representing a computer-interpretable function. Preferentially, said functions are provided by an enhancement packet. A configuration guide as used herein is used for enabling a user by means of a graphical user interface (GUI) to select and deselect one or more of said functions and/or to inspect the set of currently selected functions. According to embodiments, the function GUI elements of the implementation guide may in addition provide a user with means for selecting one of said functions and for automatically updating a display device showing a graphical representation of the implementation guide based on a user's selection. According to preferred embodiments, the enhancement packet is a cumulative enhancement packet and comprises all functions of a core application program to be enhanced. According to said embodiments, the implementation guide may display all said cumulated functions of said enhancement packet for selection by the user. The functions may be displayed on a display device and may be represented by 'function GUI elements' such as check boxes, radio buttons, selectable nodes of a dynamically expandable tree and the like. According to embodiments only the functions are graphically represented as function GUI elements. The term 'implementation guide' as used herein should not be considered as a specification for implementing one or more functions by writing some code sections, but rather as a data structure for selecting which of a plurality of existing application software functions provided by an enhancement package should be enabled and thereby made available for execution as part of an application program. Said application program may be, for example, specified within a core section of the enhancement package or by a computer object provided by said packet, the computer object being external to said core. An example of an implementation guide is the 'SAP Reference IMG'.

According to embodiments, the selectable function GUI elements of the implementation guide represent computer implemented functions encoded in the enhancement package. The execution of said functions depends on the selection state of their respective function GUI element in the implementation guide. For example, the source code of an enhancement packet may comprise a method which comprises a checking routine. Said checking routine may trigger the evaluation of the selection state of a function GUI element of the implementation guide before said method is executed as part of one or more complex business workflows provided by the enhancement packet. The method is only executed in case the result of said check returned that the corresponding function GUI element was selected.

A 'function switch' as used herein is a switch which is assigned to a function or a sub-function of an enhancement packet. According to embodiments, an 'active function switch' as used herein is a function switch whose assigned function or sub-function is represented by a function GUI element of the implementation guide having been selected by the user. Accordingly, an 'inactive function switch' as used herein may be a function switch whose assigned function or sub-function is represented by a currently unselected function GUI element of the implementation guide.

A 'conflict switch' as used herein is a switch having assigned at least two switches of any combination of a function switch or a conflict switch. According to embodiments, a conflict switch is a special type of switch which becomes not switched on when a function is selected and activated but when all of its assigned switches become active. Conflict switches are used to handle conflicting selected functions by offering an enhancement implementation which is executed in case of a conflicting selection instead of the selected conflicting functions.

An 'active conflict switch' as used herein is a conflict switch whose assigned functions have all been selected by a user. Depending on the embodiment and the particular conflict switch, the assignment between the conflict switch and the functions may be based on a 'direct' or 'short path' connection via one single function switch between each function and the conflict switch or may be based on an 'indirect' or 'long path' connection based on said in-between function switch in combination with a chain of one or more additional conflict switches between said conflict switch and the in-between function switch. Correspondingly, an 'inactive conflict switch' as used herein is a conflict switch having directly or indirectly assigned at least one function switch whose corresponding function is currently not selected.

According to embodiments, each conflict switch may have assigned one or more attributes. An attribute may be indicative of the conflict switch's current state (active or inactive), the type of the switch (conflict switch, function switch or others) and/or the type and identity of all function switches and/or conflict switches currently assigned to the conflict switch.

According to embodiments, the compilation and analysis of the first list of switches for updating the displayed implementation guide in dependence on the analysis result is executed upon each single selection of a function GUI element and the results of said calculation are used to automatically update the implementation guide and the selection status of the function GUI elements.

A 'computer object' as used herein is any structural unit of an enhancement packet, e.g. a class, a set of classes, a script or a set of scripts or the like which comprises one or more functions which may be activated or deactivated via a selection of function GUI elements of the implementation guide.

A 'computer-readable storage medium' or 'computer program product' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. References to a computer-readable storage medium should be interpreted as possibly being multiple computer-readable storage mediums. Various executable components of a program or programs may be stored in different locations. The computer-readable storage medium may for instance be multiple computer-readable storage medium within the same computer system. The computer-readable storage medium may also be computer-readable storage medium distributed amongst multiple computer systems or computing devices.

'Computer memory' or 'memory' or 'storage' is an example of a computer-readable storage medium. Computer memory is any memory which is directly accessible to a processor. Examples of computer memory include, but are not limited to: RAM memory, registers, and register files. References to 'computer memory' or 'memory' or 'storage' should be interpreted as possibly being multiple memories. The memory may for instance be multiple memories within the same computer system. The memory may also be multiple memories distributed amongst multiple computer systems or computing devices.

A 'computer system' as used herein encompasses any device comprising a processor. A 'processor' as used herein encompasses an electronic component which is able to execute program code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computer system should also be interpreted to possibly refer to a collection or network of computing devices each comprising a processor or processors.

A 'user interface' as used herein is an interface which allows a user to interact with a computer or computer system. A 'user interface' may also be referred to as a 'human interface device.' A user interface may provide information or data to the user and/or receive information or data from the user. A user interface may enable input from a user to be received by the computer and may provide output to the user from the computer. In other words, the user interface may allow a user to control or manipulate a computer and the interface may allow the computer indicate the effects of the user's control or manipulation. The display of data or information on a display or a graphical user interface is an example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from a user.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bistable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

A 'database' as used herein encompasses a data file or repository which contains data that may be accessed by a processor. Examples of databases are, but are not limited to: a data file, a relational database, a file system folder containing data files, a collection of data tables and a spreadsheet file.

Embodiments of the present invention are directed to a tool that allows users to selectively activate, implement and/or deploy computer application functions provided in an enhancement package. In particular, the disclosed embodiments may provide a tool that facilitates a more efficient selection of computer application functions that will be applied to the application as part of an enhancement package add-on.

In one aspect, the invention relates to a computer-implemented method for selecting one or more functions, the functions preferentially being provided by an enhancement package, for display. The selection is performed via an implementation guide. The implementation guide is a hierarchical data structure comprising nodes, wherein at least some of said nodes respectively represent one of said one or more functions. The method comprises:

retrieving, by a processor in response to a user's selection of one of the one or more functions, a first list of switches, the first list of switches comprising all switches assigned to the one selected function;

extracting one or more individual switches from the first list of switches, wherein the extracted individual switches include at least one of either function switches or conflict switches, wherein a conflict switch has at least two switches of any combination of function switches or conflict switches assigned to it and wherein each function switch is assigned to one of the one or more functions and optionally also to a conflict switch and wherein each conflict switch is assigned to at least two of the one or more functions via two of the function switches and optionally in addition via one or more of the conflict switches;

determining, for each of the one or more extracted switches, whether the extracted switch is an active conflict switch, wherein an active conflict switch is any conflict switch whose assigned functions are currently all selected;

in case any of the extracted switches is determined to be an active conflict switch, adding the active conflict switch to a second list of switches;

after all switches in the first list of switches have either been removed from the first list or have been added to the second list of switches, processing the second list of switches for determining which of the one or more computer functions can to be execute on the processor without conflicts; and as a result of the processing, presenting, by the processor in a graphical user interface, one or more function GUI elements, each of the function GUI elements representing one of the one or more functions determined to be executable without conflicts on the processor.

Said features may be advantageous, because contrary to state of the art systems only function GUI elements are displayed which do not conflict with other functions already having been selected by said or another user. Thus, a potential conflict of two or more functions caused by a selection of the user is automatically resolved as functions having been determined not to executable without conflicts are not displayed to the user.

According to embodiments, the list of 'relevant switches' or 'second list of switches' as used herein is may be considered as a set of switches which are determined after evaluating a plurality of switches assigned to a user-selected function. The switches of the second list of switches are 'relevant' for resolving and/or prohibiting conflicts and are used as input for automatically updating the displayed function GUI elements. At first, one or more conflict switches may be activated in dependence on the selection of function GUI elements of the implementation guide. The selected function switches and conflict switches may be used as input for determining if any of the function GUI elements of the implementation guide should be displayed or hidden for avoiding a conflict. The display screen is then refreshed and the set of displayed function GUI elements updated. Function GUI elements representing functions which conflict with each other may be hidden and not displayed as part of the implementation guide at all. In many cases the list of relevant switches will only contain one or more conflict switches and no other switches. This means that the resulting reaction, i.e., hiding or showing the one or more function GUI elements having caused the conflict, is a kind of "new function" assigned to the conflict switch. With this new logic it is possible to activate, implement or deploy a proper solution for each situation which was not possible in state-of-the-art systems wherein additional "decision nodes" not having assigned any executable function merely made the topology of the implementation guide more complex but did not provide for any extra functionality for resolving conflicts arising from a co-selection of two or more functions. As the conflict switch is not represented in the implementation guide as a GUI element, the topology of the implementation guide according to embodiments as claimed is not further complicated. Instead, by triggering the hiding of functions GUI elements by an active conflict switch the complexity of the implementation guide is further reduced.

According to embodiments the "activation of a computer object" or an "activation of a function of the enhancement package" selected by the user may comprise displaying a GUI element, in particular a function GUI element, i.e., a GUI element representing a particular function provided by an enhancement packet, enabling the execution of a program routine or set of routines at a particular predefined checkpoint within the code of a module of the enhancement packet or the like.

According to some embodiments, each function, function switch and/or conflict switch has respectively assigned one or more attributes.

According to further embodiments, the retrieving comprises:

analyzing by the processor, attributes of the selected function to identify which function switches are assigned to the selected function;

further analyzing the attributes of the identified function switches to determine which of said function switches are assigned to a respective conflict switch, thereby also determining which conflict switch is assigned to the selected function;

analyzing each of the determined conflict switches to determine if any other of the conflict switches are assigned to said determined conflict switch; and adding each conflict switch having been determined in the analysis to be assigned to the selected function or being assigned to one of the determined conflict switches to the first list of switches.

Said features are advantageous as the attributes may comprise information being indicative of the assignment of functions to function switches and of function switches to conflict switches. Said attributes may be stored in a configuration having e.g. the form of a relational database or having the form of one or more configuration files. By modifying any of said attributes via a GUI, a developer may modify the assignment between functions and switches without having to recompile the enhancement packet.

According to embodiments the attributes are stored in a tabular configuration data structure of the enhancement package. At least some first ones of the attributes are indicative of 'if' and 'which one' of the function switches are assigned to any of the functions. At least some second ones of the attributes are indicative of 'if' and 'which one' of the conflict switches are assigned to any of the function switches. And at least some third ones of the attributes are indicative of the status of the function, said status being 'active' if the function GUI element of said function is currently selected by the user, said status otherwise being 'inactive'.

That some attributes are indicative of the status information of their respective function may be advantageous, because it is not necessary to traverse the whole graph of interconnected functions, function switches and conflict switches in order to determine if a particular function switch or conflict switch is active or not. Rather, this may be determined only once for a currently selected or deselected function and may then be stored in the attributes of all function switches and conflict switches affected by said selection or deselection. Thus, redundant calculations of the state of a particular switch can be avoided and the performance of the method may be increased.

According to embodiments the data content of the configuration data structure is automatically updated upon the receipt of the selection of the one function by the user if in addition the one selected function was automatically determined not to conflict with any of the other functions, wherein updating an attribute in dependence on the users selection implies changing one of the third attributes assigned to the selected functions from 'inactive' to 'active'. Said features may be advantageous as automatically updating the attributes in the configuration file in accordance with the automatically calculated result ensures that two conflicting functions can never be stored as 'activated' at the same time, thus ensuring integrity of data and workflows.

According to embodiments the first list of switches is sorted before executing the extraction step in a way that conflict switches appear prior to function switches within said first list of switches. Said feature may be advantageous as this feature may allow to skip the step of evaluating whether an active function switch is assigned to a conflict switch: after having processed all conflict switches being contained in the first list of switches, analyzing the function switches may be skipped completely as the aim of the analysis may be reached already after having evaluated all conflict switches for active conflict switches.

According to embodiments the determining whether the extracted switch is an active conflict switch comprises:
  determining if the extracted switch is a conflict switch;
  in case the extracted switch is a conflict switch, determining if the extracted switch is an active conflict switch, whereby the extracted switch is an active conflict switch when all function switches or conflict switches assigned to the extracted switch are switched on, wherein a function switch is selected (or 'switched on') in case its assigned function is currently selected and wherein a conflict switch is turned on in case all functions assigned to said conflict switch are currently selected; the functions may respectively be assigned to a conflict switch via one of the function switches and optionally in addition via one or more conflict switches. According to embodiments, said assignment is implemented based on attributes stored in association with the functions, function switches and/or conflict switches;
  in case the extracted switch is not an active conflict switch, determining that the extracted switch is an inactive conflict switch; and
  deleting the inactive conflict switch from the list of all switches.

According to embodiments the processing the second list of switches comprises identifying, for each active conflict switch in the second list, a switch conflict resolution indicated by said active conflict switch, the switch conflict resolution being a set of program instruction for prohibiting the execution of two conflicting ones of the one or more functions; and executing the identified switch conflict resolution, thereby modifying the displaying of at least one of the one or more function GUI elements representing conflicting functions. According to embodiments, a switch conflict resolution is a program routine provided by the enhancement packet and being operable to guarantee that the two conflicting functions cannot be selected and activated concurrently. For example, such a switch conflict resolution may trigger the hiding of a function GUI element of one of two or more conflicting functions and an automated deselection and deactivation of such a conflicting function.

According to embodiments the modification comprises hiding and/or displaying function GUI elements in dependence on the result of the functions having been determined to be executable without conflicts on the processor.

According to embodiments the method further comprises updating the display of the function GUI elements upon each selection of one of the functions by the user, wherein the visibility of the updated function GUI elements depends on the result having been calculated upon said selection and being indicative of one or more conflicting functions.

According to embodiments the user selection of one of the one or more functions comprises the steps of:
  displaying to the user the one or more function GUI elements representing the one or more functions, wherein each of said function GUI elements is a selectable GUI element;
  receiving a signal being indicative of the one function selected by the user from a selected function GUI element;
  Presenting the one or more function GUI elements as a result of the processing comprises updating the display of the one or more function GUI elements in dependence on the one or more functions determined to be executable without conflicts.

Said features may be advantageous as they provide the user feedback that a particular conflicting function may have been disabled and prohibit a user from selecting such conflicting functions.

According to embodiments presenting the one or more function GUI elements as a result of the processing comprises hiding at least one first and at least one second function GUI element, the at least one first GUI element representing a first one of the one or more functions, the at least one second GUI element representing a sec- and one of the one or more functions, the first function having been determined to conflict with the second function.

According to embodiments the method further comprises: evaluating each switch in the first list of switches to determine whether the switch is a conflict switch; for switches determined to be a conflict switch, determining whether the conflict switch is active or inactive.

According to embodiments nodes comprise leaf-nodes and non-leaf nodes and wherein at least some of the non-leaf nodes respectively represent one of the functions displayed via the implementation guide and wherein each leaf node represents computer-implemented routines operable to execute one of said functions or parts thereof.

According to embodiments the method further comprises:
  executing at least one of the functions provided by the enhancement package, wherein the computer-implemented instructions specifying said function comprise a checking routine at the begin of each of said function, said checking routine being operable to determine whether said function was selected and was determined not to conflict with one of the other selected functions.
  in case said function is determined by the checking routine to be selected and not to conflict, executing the function.

In a further aspect the invention relates to a computer readable non transitory storage medium embodied with program instructions executable by a processor, the instructions causing the processor to perform a method for selecting one or more functions for display in an implementation guide according to anyone of the above embodiments.

In a further aspect the invention relates to a computer system comprising:
  a display device for displaying a graphical user interface;
  a processor;
  a computer-readable non-transitory storage medium comprising instructions being executable by the processor, said instructions specifying
  an enhancement package configuration tool being adapted for selecting one or more functions provided by an enhancement package for display the selection being performed via an implementation guide, wherein the implementation guide is a hierarchical data structure comprising nodes, wherein at least some of said nodes respectively represent one of said one or more functions, the functions being provided by an enhancement package by:
  retrieving, in response to a user's selection of one of the one or more functions, a first list of switches, the first list of switches comprising all switches assigned to the one selected function;
  extracting one or more individual switches from the first list of switches, wherein the extracted individual switches include at least one of either function switches or conflict switches, wherein a conflict switch has at least two switches of any combination of function switches or conflict switches assigned to it and wherein each function switch is assigned to one of the one or more functions and optionally also to a conflict switch and wherein each conflict switch is assigned to at least two of the one or more functions via two of the function switches and optionally in addition via one or more of the conflict switches;
  determining, for each of the one or more extracted switches, whether the extracted switch is an active conflict switch, wherein an active conflict switch is any conflict switch whose assigned functions are currently all selected;
  in case any of the extracted switches is determined to be an active conflict switch, adding the active conflict switch to a second list of switches;
  after all switches in the first list of switches have either been removed from the first list or have been added to the second list of switches, processing the second list of switches for determining which of the one or more computer functions are to be executable on the processor without conflicts; and
  as a result of the processing, presenting, by the processor in a graphical user interface, one or more function GUI elements, each of the function GUI elements representing one of the one or more functions determined to be executable without conflicts on the processor.

In a further aspect, the invention relates to a method for selecting computer application functionality for implementation from an enhancement package, the method comprising:
  retrieving, by a processor in response to user selection of a specific computer application function, a list of all switches assigned to the selected function, wherein the selected function is represented as a node in a hierarchical data structure;
  extracting individual switches from the list of all switches, wherein individual switches include at least one of either function switches or conflict switches, wherein a conflict switch has at least two switches of any combination of function or conflict switches assigned to it and function switches are assigned to a function and optionally also to a conflict switch;
  determining whether the extracted switch is an active conflict switch;
  based on the determination that the extracted switch is an active conflict switch, adding the active conflict switch to a list of relevant switches;
  after all switches in the list of switches have either been removed from the list of all switches or added to the list of relevant switches, processing the list of relevant switches; and
  as a result of the processing, presenting, by the processor in a graphical user interface, an implementation guide indicating which specific computer application functions are to be executing on the processor.

According to embodiments, the retrieving comprises:
  analyzing by the processor, attributes of the selected function at a node or sub-node under review to identify which function switches are assigned to the node or sub-node under review;
  further analyzing the attributes of the identified function switches to determine which are assigned to a respective conflict switch, and which conflict switch is also assigned to the selected function;
  analyzing the respective conflict switch to determine if any other conflict switches are assigned to the respective conflict switch; and
  based on the results of the analysis, adding each respective conflict switch that is assigned to the selected function to the list of all switches.

According to embodiments the determining whether the extracted switch is an active conflict switch comprises: determining the extracted switch is an active conflict switch when all function or conflict switches assigned to the extracted switch that are switched on; otherwise, the extracted switch is an inactive conflict switch; and deleting the inactive conflict switch from the list of all switches.

According to embodiments processing the list of relevant switches comprises indentifying the switch conflict resolution indicated by the active conflict switch; and modifying the implementation guide according to the identified switch conflict resolution.

In a further aspect, the invention relates to an enhancement implementation analysis method, the method comprising:
  determining by a processor a node in an implementation hierarchy to be analyzed for conflicts;
  retrieving from a data store, as a result of the determination by the processor, a list of all switches assigned to the node in the implementation hierarchy;
  considering each switch in the list of all switches to determine whether the switch is a conflict switch;
  for switches determined to be a conflict switch, determining whether the conflict switch is active or inactive;
  upon a determination the conflict switch is an inactive conflict switch, deleting the conflict switch from the retrieved list of all switches;
  upon a determination the conflict switch is an active conflict switch, adding the conflict switch to a list of relevant switches; and
  processing the list of relevant switches to resolve conflicts.

In a further aspect, the invention relates to an enhancement implementation analysis tool, the tool comprising:
  a display device for displaying a graphical user interface; and
  a processor configured to:
  construct, in response to a selection of a specific computer application function in the graphical user interface, a list of all switches assigned to the selected function, wherein the selected function is represented as a node in a hierarchical data structure;
  extract individual switches from the list of all switches, wherein individual switches include at least one of either a function switch or a conflict switch, wherein a conflict switch has at least two switches of any combination of function or conflict switches assigned to it and a function switches are assigned to either a function and optionally also to a conflict switch;
  determine whether the extracted switch is an active conflict switch;
  based on the determination that the extracted switch is an active conflict switch, add the active conflict switch to a list of relevant switches;

after all switches in the list of switches have either been removed from the list of all switches or added to the list of relevant switches, process the list of relevant switches; and as a result of the processing, present, by the processor in a graphical user interface, an implementation guide indicating which specific computer application functions are to be executing on the processor.

According to embodiments the processor is further configured to construct the list of all switches by:

analyzing by the processor, attributes of the selected function at a node or sub-node under review to identify which function switches are assigned to the node or sub-node under review;

further analyzing the attributes of identified function switches to determine which are assigned to a respective conflict switch and the attributes of any conflict switches to identify selected functions to which the conflict switches are assigned;

analyzing the respective conflict switch to determine if any other conflict switches are assigned to the respective conflict switch; and based on the results of the analysis, adding each respective conflict switch that is assigned to the selected function to the list of all switches.

According to embodiments the processor is further configured to determine whether the extracted switch is an active conflict switch, by: determining the extracted switch is an active conflict switch when all function or conflict switches assigned to the extracted switch that are switched on; otherwise, the extracted switch is an inactive conflict switch; and deleting the inactive conflict switch from the list of all switches.

According to embodiments the processor is further configured to process the list of relevant switches by: identifying the switch conflict resolution indicated by the active conflict switch; and modifying the implementation guide according to the identified switch conflict resolution.

In a further aspect, the invention relates to a computer readable medium embodied with program instructions executable by a processor, the processor performing a method for selecting computer application functionality for implementation from an enhancement package, comprising:

retrieving, by a processor in response to user selection of a specific computer application function, a list of all switches assigned to the selected function, wherein the selected function is represented as a node in a hierarchical data structure;

extracting individual switches from the list of all switches, wherein individual switches include at least one of either function switches or conflict switches, wherein a conflict switch has at least two switches of any combination of function or conflict switches assigned to it and function switches are assigned to a function and optionally also to a conflict switch;

determining whether the extracted switch is an active conflict switch;

based on the determination that the extracted switch is an active conflict switch, adding the active conflict switch to a list of relevant switches;

after all switches in the list of switches have either been removed from the list of all switches or added to the list of relevant switches, processing the list of relevant switches; and as a result of the processing, presenting, by the processor in a graphical user interface, an implementation guide indicating which specific computer application functions are to be executing on the processor.

According to embodiments, the retrieving comprises:

analyzing by the processor, attributes of the selected function at a node under review to identify which function switches are assigned to the node under review;

analyzing the identified function switches to determine which are assigned to a respective conflict switch;

analyzing the respective conflict switch to determine if any other conflict switches are assigned to the respective conflict switch; and based on the results of the analysis, adding each respective conflict switch that is assigned to the selected function to the list of all switches.

According to embodiments determining whether the extracted switch is an active conflict switch, comprises: determining the extracted switch is an active conflict switch when all function or conflict switches assigned to the extracted switch that are switched on; otherwise, the extracted switch is an inactive conflict switch; and deleting the inactive conflict switch from the list of all switches.

According to embodiments the processing the list of relevant switches, comprises: indentifying the switch conflict resolution indicated by the active conflict switch; and modifying the implementation guide according to the identified switch conflict resolution.

In a further aspect the invention relates to an enhancement implementation analysis method, comprising:

determining by a processor a node in an implementation hierarchy to be analyzed for conflicts;

retrieving from a data store, as a result of the determination by the processor, a list of all switches assigned to the node in the implementation hierarchy;

checking the list of retrieved switches to determine whether the switch is a conflict switch;

for switches determined to be a conflict switch, determining whether the conflict switch is active;

upon a determination the conflict switch is an inactive conflict switch, deleting the conflict switch from the retrieved list of all switches;

upon a determination the conflict switch is an active conflict switch, adding the conflict switch to a list of relevant switches; and processing the list of relevant switches to resolve conflicts.

BRIEF DESCRIPTION OF THE DRAWINGS

In the following embodiments of the invention are explained in greater detail, by way of example only, making reference to the drawings in which:

FIGS. 2A-2C illustrate exemplary screenshots of an implementation guide usable with embodiments of the present invention.

DETAILED DESCRIPTION

Figure 1:
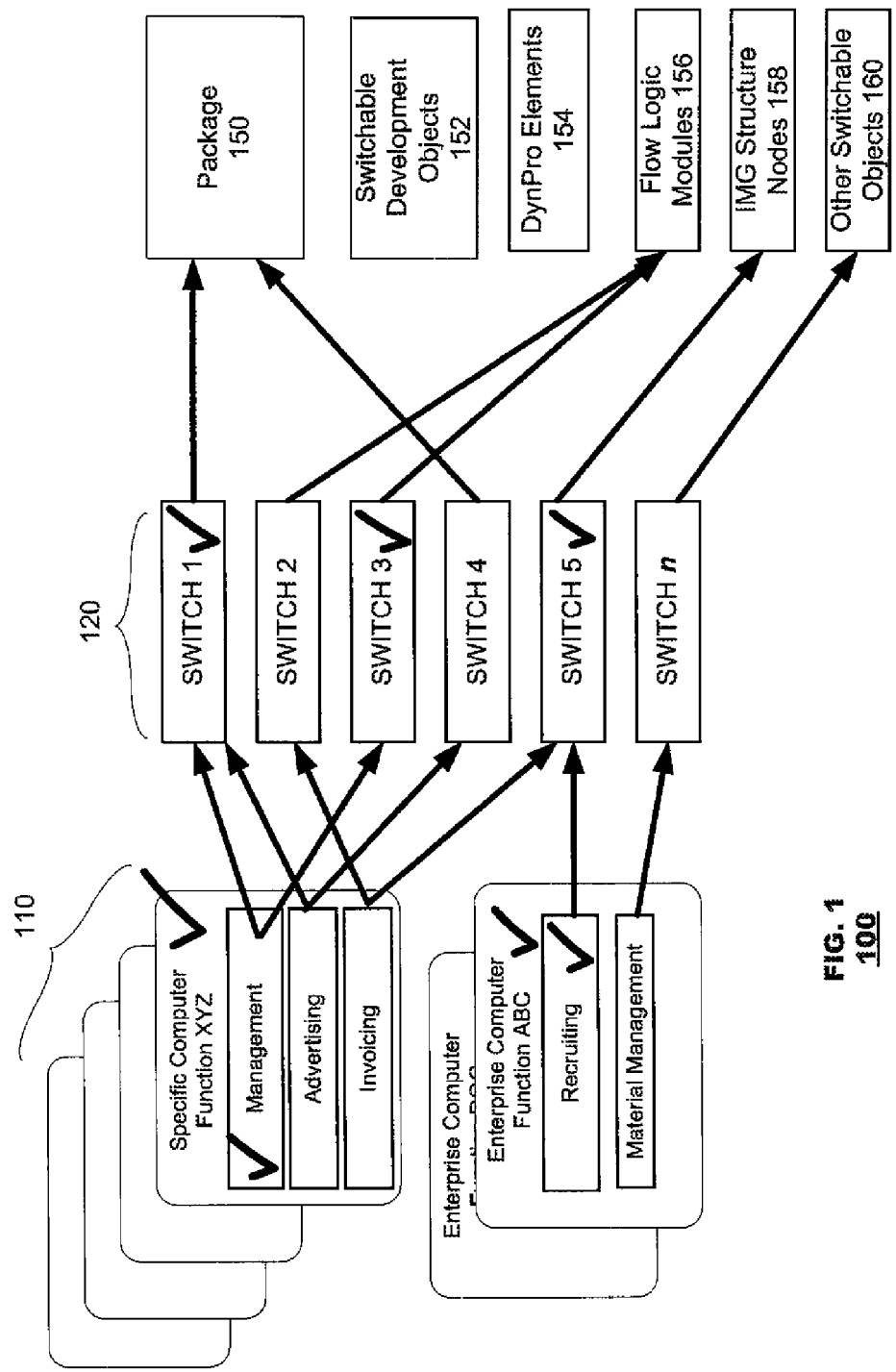
FIG. 1 illustrates a graphical representation of the operation of a tool for facilitating use of the implementation guide for selection of a computer function.

Disclosed embodiments provide an enhancement implementation analysis method. A processor may determine a node in an implementation hierarchy to be analyzed for conflicts. As a result of the determination by the processor, a list of all switches assigned to the node in the implementation hierarchy may be retrieved from a data store. The list of retrieved switches may be checked to determine whether the switch is a conflict switch. For switches determined to be a conflict switch, the processor may further determine whether the conflict switch is active. Upon a determination that the conflict switch is an inactive conflict switch, the conflict switch may be deleted from the retrieved list of all switches. If the conflict switch is determined to be an active conflict switch, the conflict switch may be added to a list of relevant switches, and the list of relevant switches may be processed to resolve conflicts.

Also, the disclosed embodiments provide an enhancement implementation analysis tool that include a display device and a processor. The display device may display a graphical user interface. The processor may be configured to construct, in response to a selection of a specific computer application function in the graphical user interface, a list of all switches assigned to the selected function. The selected function may be represented as a node in a data structure, and the node may have a plurality of leafs representing sub-functions related to the selected function. The processor may also be configured to extract individual switches from the list of all switches. All switches in the list may include function switches and conflict switches. A conflict switch may have at least two switches of any combination of function or conflict switches assigned to it and function switches are assigned to either a function or sub-function. The processor may further be configured to determine whether the extracted switch is an active conflict switch, and based on the determination that the extracted switch is an active conflict switch, add the active conflict to a list of relevant switches. After all switches in the list of switches have either been removed from the list of all switches or added to the list of relevant switches by the configured processor, the processor may process the list of relevant switches. As a result of the processing, the processor may present in the graphical user interface on the display device, an implementation guide indicating which specific computer application functions are to be executing on the processor.

In order to be able to provide this selectivity for functions within a computer application, the developers must perform more tasks during development that facilitates the selection of the new, or enhanced, functions provided by the respective changes to the computer objects of the computer application. For example, a switch enhancement framework may be implemented that analyzes the switches referred to in FIG. 1. The switch enhancement framework may provide additional capabilities beyond the current switching techniques used in other areas, such as the adaptation of source code, user interfaces, presentation of screens and application menus.

As explained with reference to FIG. 1, when a computer function is selected for implementation in a graphical user interface, a switch may be set turning on the computer objects that provide the selected functionality, related implementation guide development objects, and other objects. In the switch enhancement framework, the switches may be assigned to a particular computer application function, such as HR management or invoicing functions. These switches may be referred to as function switches. The function switches are turned on when the particular computer application function to which it is assigned is turned on, e.g. by a user selecting a corresponding function GUI element. Said corresponding function GUI element may be provided by the implementation guide itself or by another software component of the computer system hosting the enhancement package or of the enhancement package itself. The switches may include attribute settings (e.g., flags, or identifiers) that indicate that the switch is a function switch.

The switch enhancement framework may also include switches referred to as a conflict switches. Conflict switches may be assigned to a function switch and may only be turned on when the function switch to which the conflict switch is assigned is turned on. A conflict switch may be assigned to more than one function switch, in which case, the conflict switch is turned on when all of the function switches assigned to it are also turned on. The conflict switches may also have attribute settings (e.g., flags, or identifiers) that indicate the switch is a conflict switch.

Figure 3:
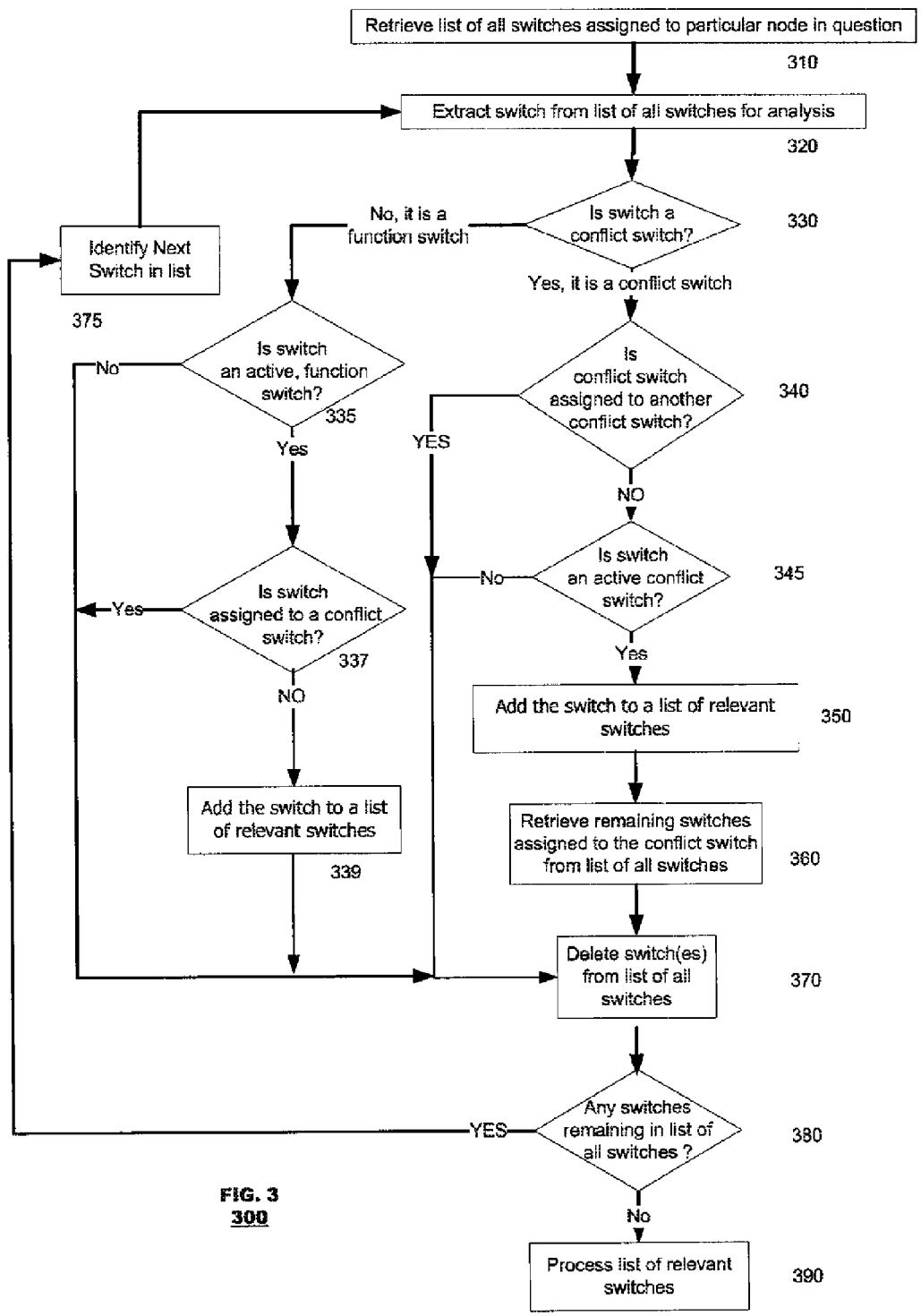
FIG. 3 illustrates a flow chart of an exemplary process according to an embodiment of the present invention.

FIG. 3 illustrates a flow chart of an exemplary process for conflict switch analysis according to an embodiment of the present invention. A user may be presented with a graphical user interface having a plurality of user control input devices (e.g., radio buttons, selectable buttons and the like) assigned to specific functions. In the conflict switch analysis process 300 executed by a processor configured as an enhancement package implementation tool, a list of all switches assigned to a node in the implementation guide may be retrieved by a processor configured as a conflict analysis tool executing on a server at step 310. At step 320, the conflict switch analysis tool may extract a switch from the list of all switches for analysis. By analyzing attributes of the switch at step 330 a decision may be made whether the switch is a conflict switch. The process 300 will follow one of two paths depending upon the decision.

In a first path, the decision at step 330 is YES, the switch is a conflict switch, the process 300 proceeds to step 340. The decision to be made at step 340 is whether the conflict switch is assigned to another active conflict switch. If the answer at step 340 is "Yes", the process 300 proceeds to step 370 to delete the conflict switch from the list of switches. Otherwise, the answer is "No, the conflict switch is not assigned to another conflict switch, and process 300 proceeds to step 345. At step 345, it may be determined whether the conflict switch is an active conflict switch. An active conflict switch may be a conflict switch that is activated when all of the function switches that are assigned to the conflict switch have been selected by a user. If the conflict switch is determined NOT to be an active switch at step 345, the process 300 may proceed to step 370, where the tool may delete the switch from the list of all switches. Otherwise, if the answer is "Yes", the process may proceed to step 350. At step 350, the conflict switch may be added to the list of relevant switches. Subsequently, the process 300 may proceed to step 360. At step 360, the tool may retrieve any remaining switches assigned to the conflict switch from the list of all switches, and, if present, from the list of relevant switches (it may be possible that a switch that is assigned to a conflict switch may be processed and added to the list of relevant switches prior to the conflict switch being analyzed). The process 300 may proceed to step 370, where the retrieved remaining switches may be deleted from the list of all switches, and, if present, from the list of relevant switches. After which the process may determine whether any switches remain in the list at step 380. If the answer is "Yes, switches remain in the list," the process 300 may identify at step 375, the next switch in the list, and the process 300 restarts at step 320. If the answer is "No, switches do not remain in the list," the process 300 proceeds to step 390 to process the list of relevant switches.

The processing of the list of relevant switches at step 390 may include executing the rules of the relevant conflict switches, and implementing the functions indicated by the conflict switches. In addition, the execution of the rules of the relevant conflict switch may cause the graphical user interface to present the functions that are indicated by the rules of the conflict switch.

Alternatively, in a second path, if it is determined from the results of the attribute analysis, at step 330, that the switch is not a conflict switch, the process 300 may proceed to step 335.

At step 335, a inquiry may be made whether the switch is an active, function switch. If the response to the inquiry is "No" at step 335, the process 300 may proceed to step 370, where the switch may be deleted from the list of all switches. Otherwise, if the response to the inquiry at step 335 is "Yes", the process 300 proceeds to step 337. At step 337, a decision whether the active function switch is assigned to an active conflict switch may be made. If the response to the inquiry at step 337 is "Yes", the process 300 may proceed to step 370, where the switch may be deleted from the list of all switches. Alternatively, if the response to the inquiry at step 337 is "No", the process 300 proceeds to step 339. At step 339, the switch may be added to the list of relevant switches. After which the process 300 may proceed to delete the active function switch from the list of all switches at step 370. Subsequently, the process 300 may continue and execute the steps 380, and either 375 or 390 as explained above.

The processing of the list of relevant switches at step 390 may include causing the graphical user interface to present the functions that are indicated by the rules of the conflict switch.

In an example, assume that switches SA and SB have a conflict. The conflict may be resolved by conflict switch CS1. Switches SA and SB are assigned to conflict switch CS1. Further assume another conflict exists between conflict switch CS1 and another switch SC. Another conflict switch CS2 may be used to resolve this conflict. Switch SC and conflict switch CS1 may be assigned to conflict switch CS2. In the process 300, the list of assigned switches may contain switches SA, SB, SC and conflict switches CS1 and CS2. Further assume that all of the switches are active (i.e., switched on). The process 300 may work through the list of switches recognizing that switches CS1 and CS2 are conflict switches. The processing of conflict switch CS1 will cause switches SA and SB to be removed from the list of all switches assigned to the particular node, while CS2 will cause switches SC and CS1 to be cleared from the list as well. Only CS2 will remain in the list of relevant switches for processing. After the list or relevant switches is processed in step 385, the process 300 may proceed to step 395, where an implementation structure, such as an implementation guide, is presented on a display device.

In an alternative embodiment, the process 300 may include a step 315 between steps 310 and 320 in which the list of all switches would be sorted. Sorting may be done, for example, where conflict switches are ordered to appear prior to function switches in the list of all switches. In this case, step 337 may not be needed as step 360 and 370 would have already deleted all function switches which are assigned to an active conflict switch.

Figure 2:
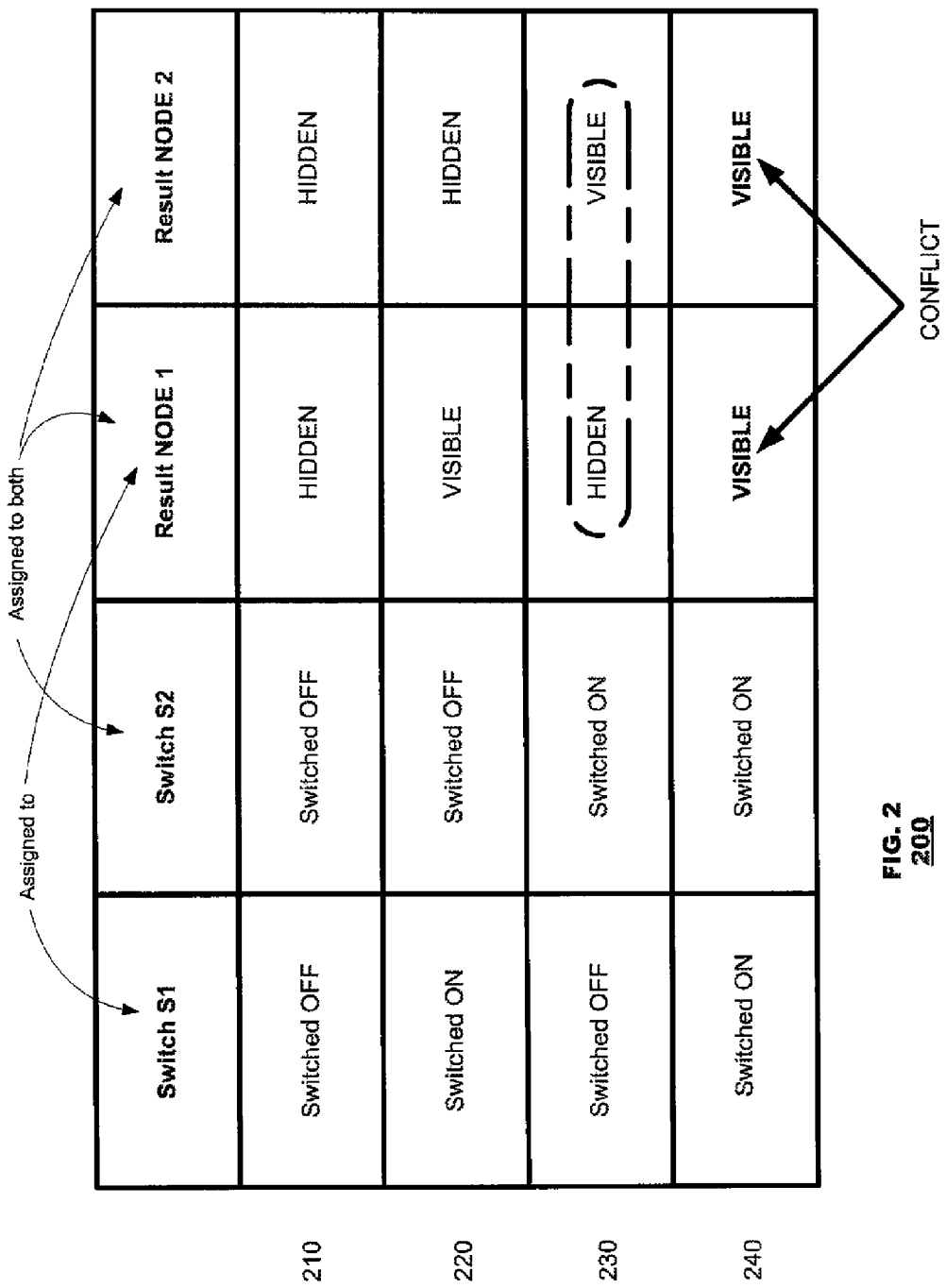
FIG. 2 illustrates a table for explaining the current problem resulting from conflicting computer objects.
Figure 2A:
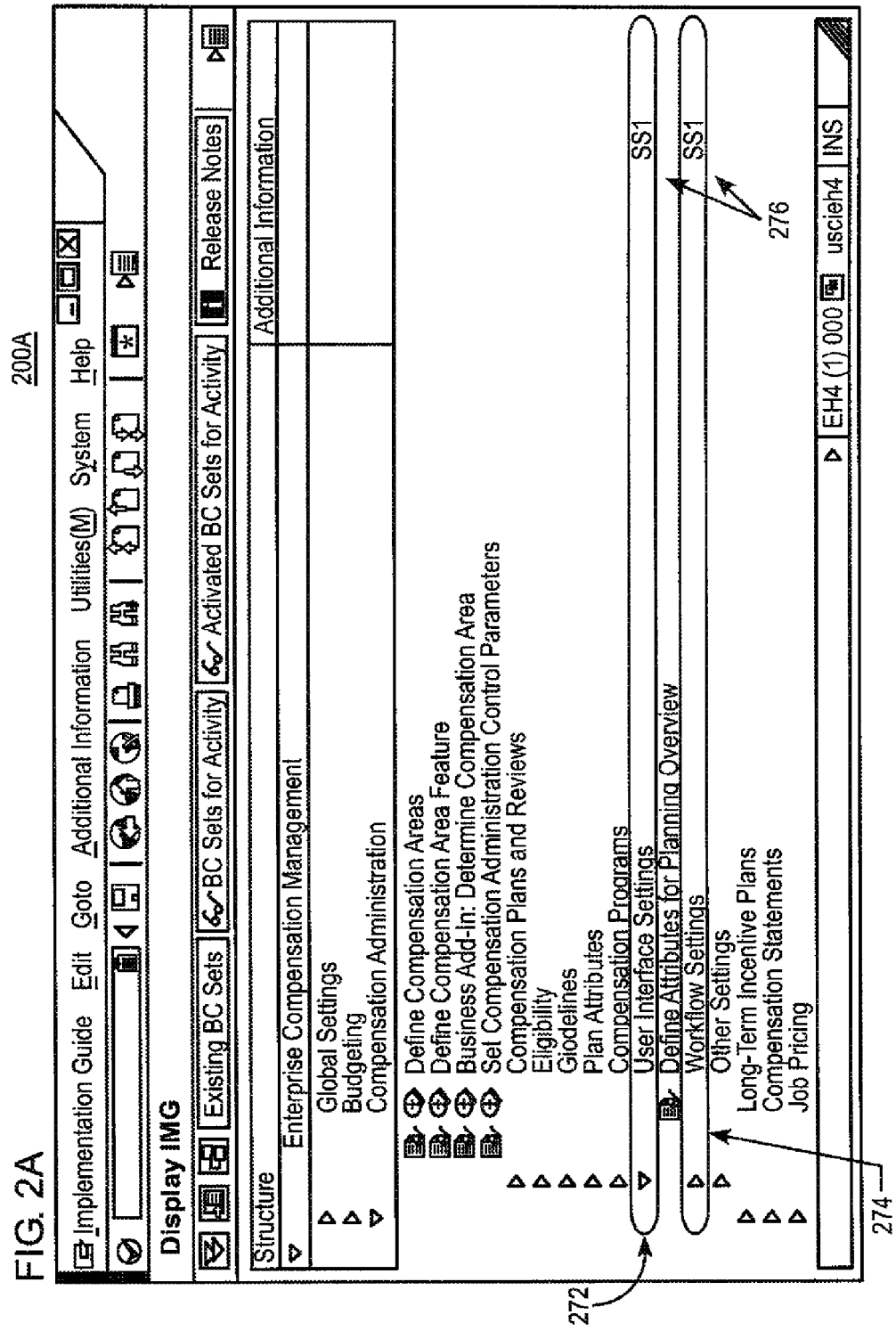
Figure 2B:
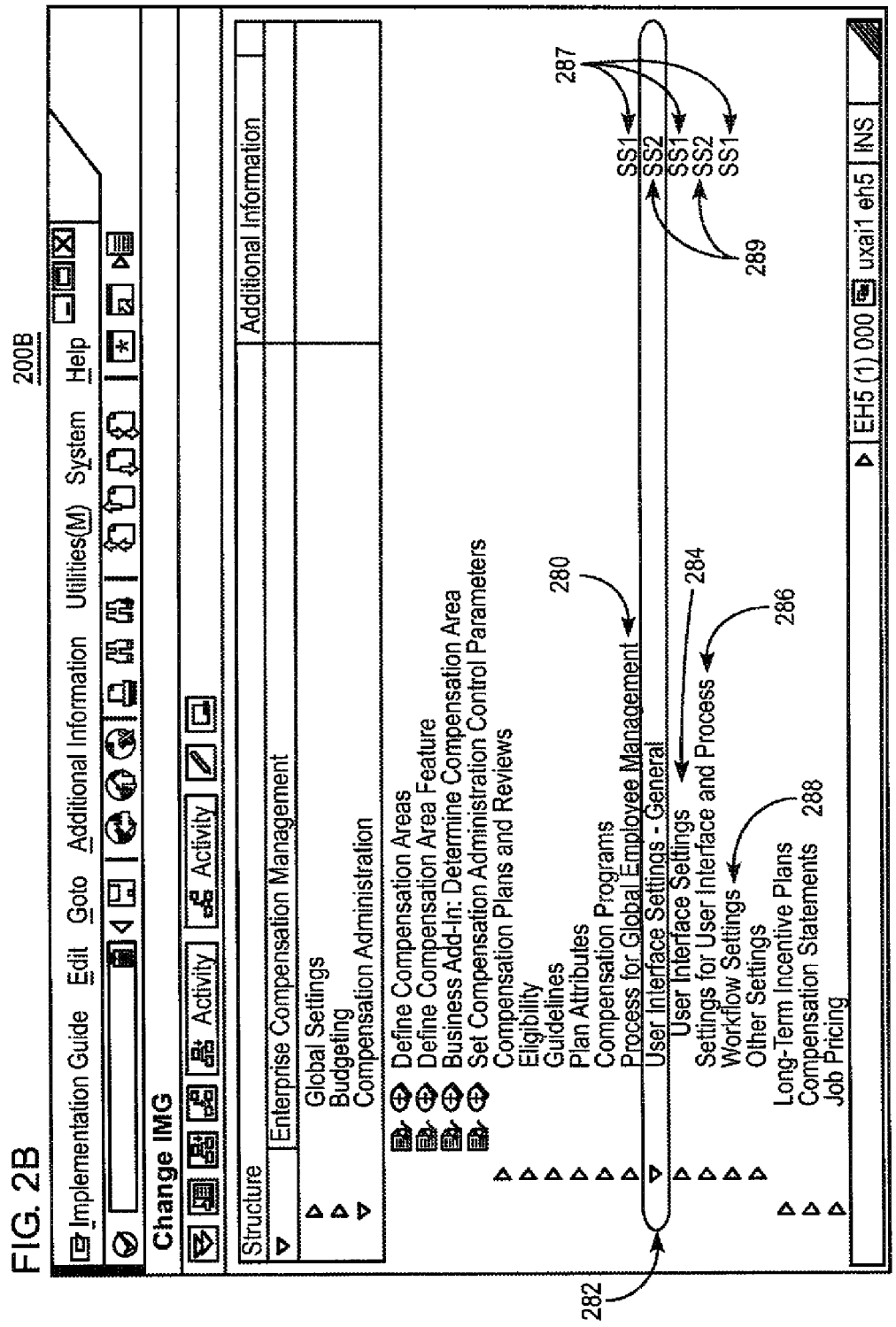
Figure 4:
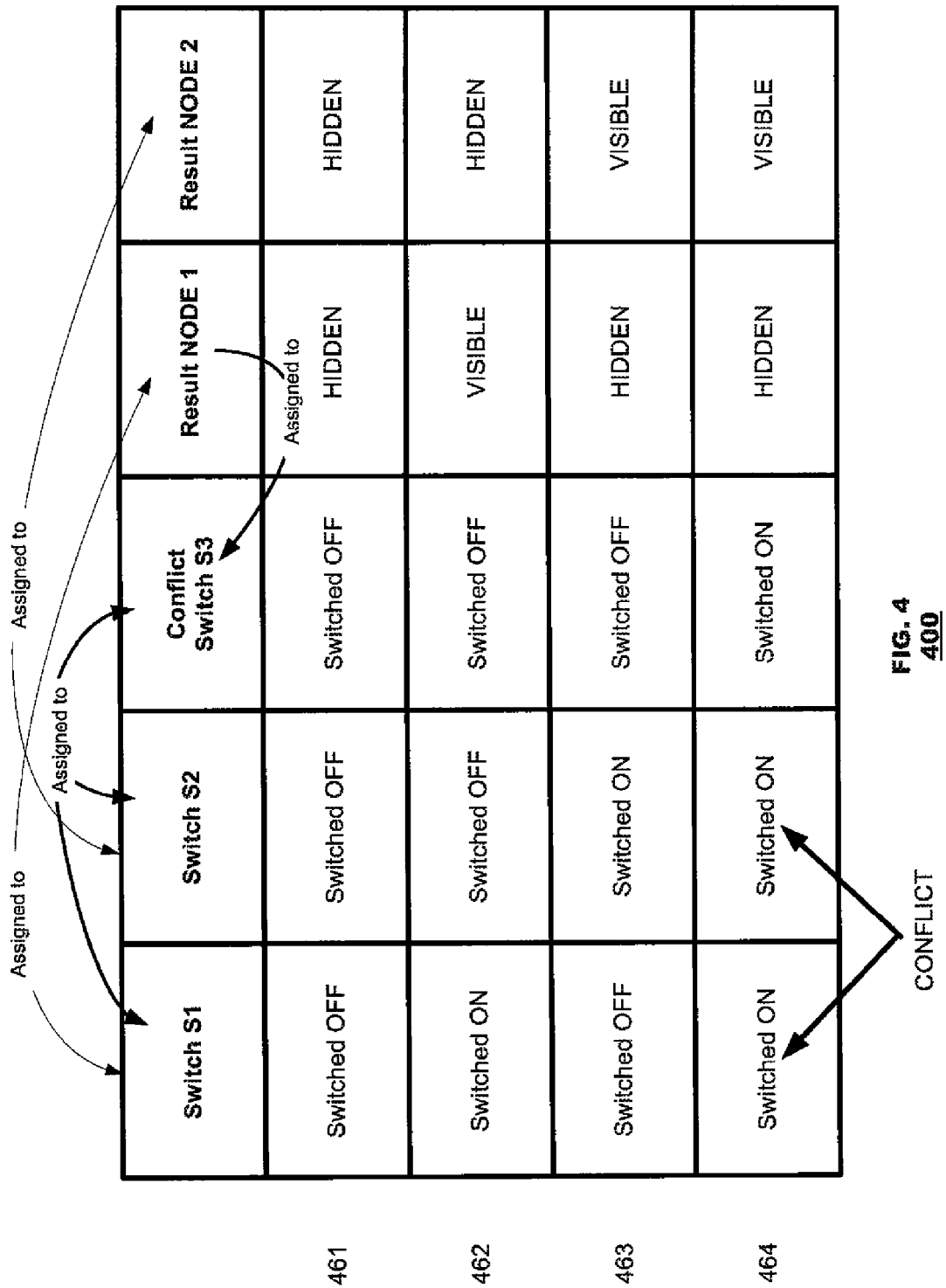
FIG. 4 illustrates a conflict switch table that indicates the implementation of a conflict switch according to an embodiment of the present invention.

FIG. 4 illustrates a conflict switch table that resolves a conflict according to an embodiment of the present invention. Continuing with the example described with respect to FIG. 2 where switch S1 is assigned to NODE1, and switch S2 is assigned to NODE2, the conflict switch table 400 of FIG. 4 indicates the operation of a conflict switch S3 as the assigned switches S1 and S2 change state. The different states of the respective function switches S1, S2 and conflict switch S3, and the result of the states of each node are shown in rows 461-464. The selected function that activates the respective function switches S1 and S2 and conflict switch S3 may represent a node in an implementation guide data structure, wherein the node has a plurality of leafs representing sub-functions related to the selected function. The sub-functions may also be assigned to a switch, such as switch S2. In row 461 of the illustrated example, nodes NODE1 and NODE2 are hidden when both switches S1 and S2 are off. In this case, conflict switch S3 may also be off. In row 462, switch S1 is switched on, and switch S2 is switched off, which results in Node1 being visible and Node2 being hidden in the implementation guide viewable in the graphical user interface. Conflict switch S3 may also be off in this situation. Conversely, when, in row 463, switch S1 is switched off, and switch S2 is switched on, which results in Node1 being hidden and Node2 being visible in the implementation guide viewable in the graphical user interface. Conflict switch S3 may again be off in this situation. In row 464, both switches S1 and S2 are switched on, which is a conflict. However, switches S1 and S2 are assigned to conflict switch S3 in which case, the logic that controls the operation of conflict switch S3 may be set to turn conflict switch S3 on, when switches S1 and S2 are on. As a result, all switches S1, S2 and S3 are on, but NODE1 is hidden, and NODE 2 is visible.

As shown in FIG. 4, computer application functions are not assigned to conflict switches instead function and/or conflict switches are assigned to a conflict switch. A conflict switch may have a number of settings that respond to the states of one or more assigned function and/or conflict switches. To be clear, other conflict switches may be assigned to a conflict switch.

Figure 5:
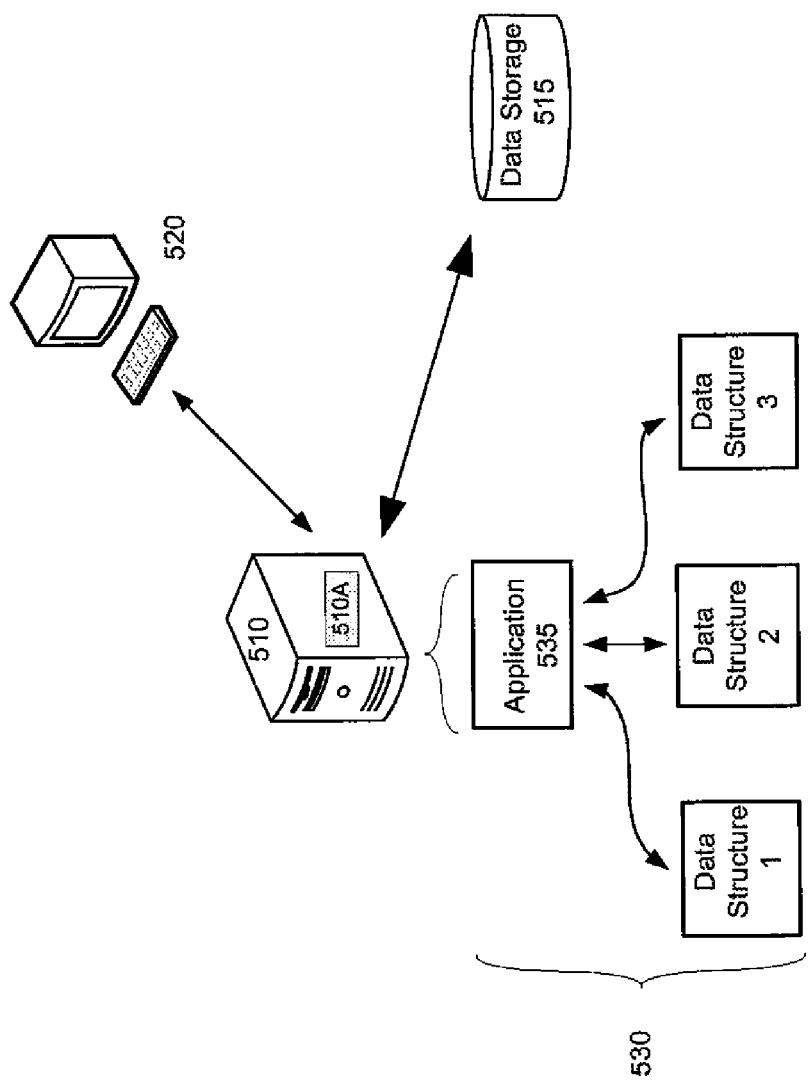
FIG. 5 illustrates an exemplary computer system for implementing a conflict switch protocol for managing an implementation guide according to an embodiment of the present invention.

FIG. 5 illustrates a computer system in which an embodiment of the present invention may be implemented. The system 500 may include a server 510, client terminal 520, and a data storage 515. A processor 510A in the server 510 may execute the computer application 535, which is available to the client terminal 520. The computer application 535 may access a plurality of data structures 1, 2, and 3 that, for example, contain rules governing the operation of the conflict switches, include data for configuring a graphical user interface for the implementation guide, functional executable code, and other data. The data structures 1, 2, and 3 may be maintained in data storage 515. A user may interact with the graphical user interface via the client terminal 520. The graphical user interface may be presented on a display device of the client terminal 520. The processor 510A may access a data structure, such as data structure 1, to retrieve the rules governing the rules related to the switches contained in the relevant lists.

An application programming interface (API) may be used to implement processes referred to in FIG. 3. For example, the functionality of obtaining a list of switches assigned to a particular conflict switch may be implemented by a specific API developed to perform that function. In addition, a function may be developed that implements the determination of whether a switch is a function switch or a conflict switch. This function may, for example, return a TRUE when the switch in question is a conflict switch, otherwise the function may return a FALSE. Another example may be of a function that returns an answer to the inquiry of whether the conflict switch is active. The function may use an identifier of the conflict switch in question, and return a TRUE when all of the conflicting switches (both function and conflict switches) assigned to the conflict switch are activated (i.e., switched on). Of course, other functions or APIs may be needed, and the above APIs and functions are only exemplary.

The server 510 and/or the client terminal 520 may include computer readable storage media, such as RAID devices, hard disk drives, memory devices, such as USB flash memory, ROM and RAM or any other magnetic or optical storage devices that may store computer readable data, and executable program instructions, such as computer application 535 and data structures 1-3. The client terminal 520 and processor 510 may access the included computer readable storage media as well as data storage device 512. The data storage device 512 may also include hard disk drives or any other magnetic or optical device suitable for storing data and/or executable program instruction code.

Figure 6:
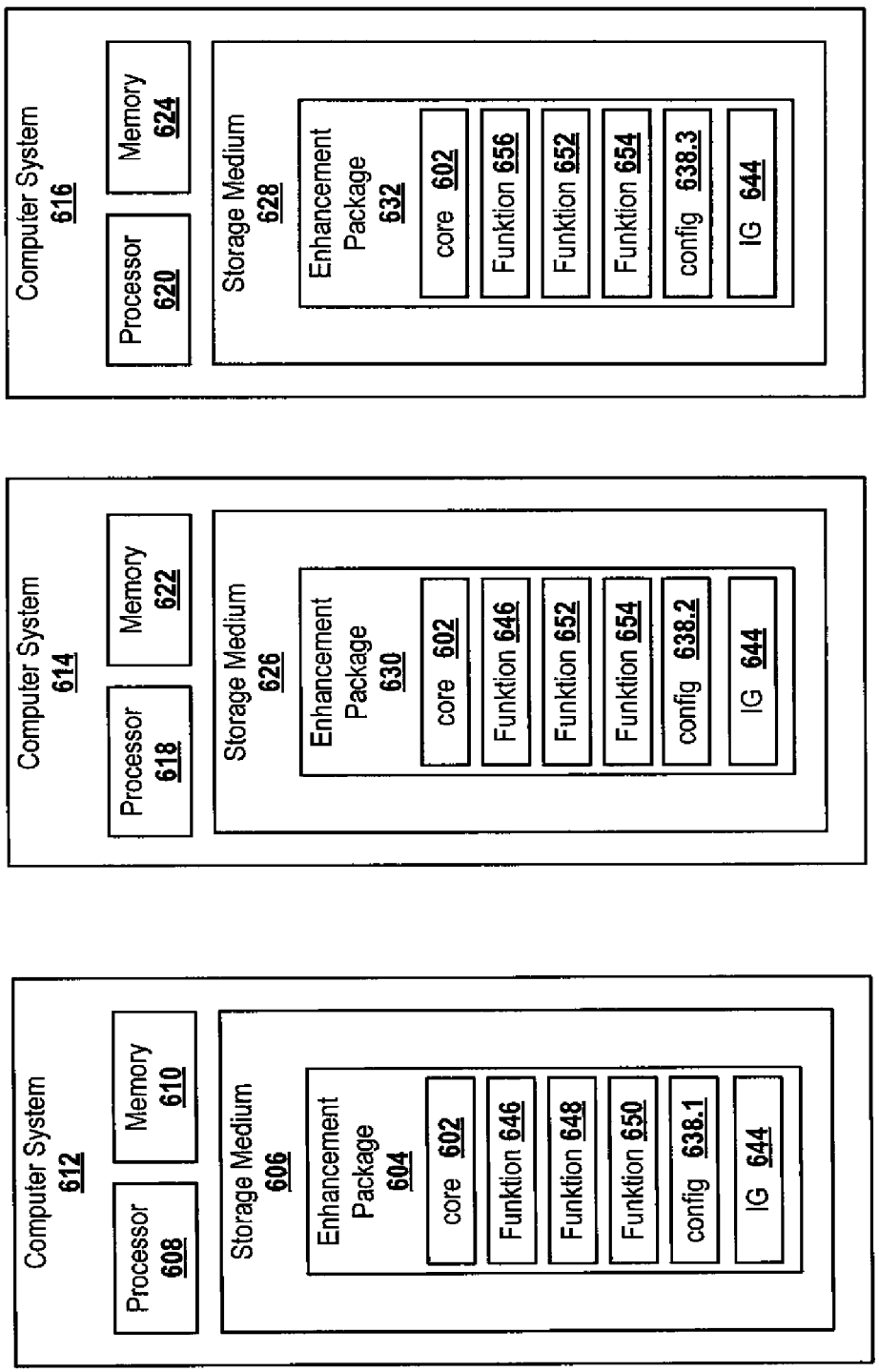
FIG. 6 illustrates three exemplary computer systems comprising different enhancement packages with different sets of functions.

FIG. 6 depicts three computer systems 612, 614, 616 respectively comprising a processor 608, 618, 620 a memory 610, 622, 624 and a computer readable, non-transitory storage medium 606, 626, 628. Each of the computer readable storage media comprises an enhancement package 604, 630, 632 respectively comprising a core 602 and one or more computer implemented functions 646-656. The particular set of functions provided by each of the enhancement packages may vary, as the various computer systems may be low two different companies having different requirements regarding the control and management of various business-related workflows or of industrial manufacturing processes. According to the depicted embodiments, each enhancement package further comprises a configuration 638.1, 638.2, 638.3 wherein the user specific selections of one or more of the functions provided by the enhancement package are stored. For example, said configuration may comprise a table wherein each of the functions of the respective enhancement package may be assigned to an identifier of a function switch. Said or another table of the configuration may in addition comprise a pre-configuration typically provided as part of the enhancement package. The pre-configuration is a data structure comprising assignments of one or more of the function switches to conflict switches and may comprise assignments of conflict switches on different hierarchical levels of the implementation guide to each other. The assignment may be based on primary and secondary keys as known from relational database systems or may be based on other kinds of data structures. The assignment of functions and switches in the pre-configuration shall ensure that users of the computer systems 612, 616, 614, typically an end-user of software functions provided by the enhancement package, may modify the configuration 638 by selecting and/or deselecting functions provided by a respective enhancement package which are in conflict with each other. Any selection of one or more functions by the user via the implementation guide is evaluated automatically based on the assignment of switches and functions as specified in the pre-configuration.

A developer of the enhancement package who may work on a computer system of the provider of the enhancement package (not shown) may pre-configure the enhancement package by assigning function GUI elements of the enhancement package to function switches and conflict switches in a way ensuring that the functions which can be selected via the implementation guide IG 644 at the same time do not conflict. In case an enhancement package was developed for updating an existing application program comprising a set of existing function with additional functions, said enhancement package may comprise said existing functions and the new functions. The switches may be assigned to the existing functions and the new functions in a way that the selection of a new function being incompatible with one of the existing function automatically results in a deselection of said existing function and in hiding a function GUI element representing said conflicting existing function. Thus, the end-user is provided with an implementation guide never comprising two or more selected conflicting functions irrespective of the end-user's selection. The implementation guide may be an integral part of each enhancement package or may be, according to other embodiments, an external component having access to the configuration 638 of the enhancement package, said package having being installed on a end-user computer system or having been compiled on a computer system of the provider of the enhancement package.

Said features may be advantageous because they enable an developer of the enhancement package having in-depth knowledge on the functions of that package to pre-configure an enhancement package before it is delivered to one of the end users in such a way that the end-user is provided with a consistent view on function GUI elements of the implementation guide wherein some function GUI elements of pre-existing functions may be hidden. This may be advantageous in particular when existing functions of an already installed software application, e.g. of an enhancement package of an earlier version, already exist and need to be replaced by a new function provided as part of a new enhancement package. Thus, it is avoided that a new function conflicts with an existing selection of one or more existing function provided by a previously installed enhancement package. The automated process of showing and hiding function GUI elements in dependence on an evaluation of active and inactive conflict switches of the implementation guide guarantees that the selected functions never conflict with each other: if a user has selected a first function which may conflict with a second function, the selection of the first function automatically triggers updating the display of the implementation guide, whereby the updated view of the implementation guide hides the function GUI element representing the conflicting second function, thus disabling the user from selecting said second function. Thus, configuring a received enhancement package by an end-user is made much more easy and error robust compared to state-of-the-art systems.

Figure 7:
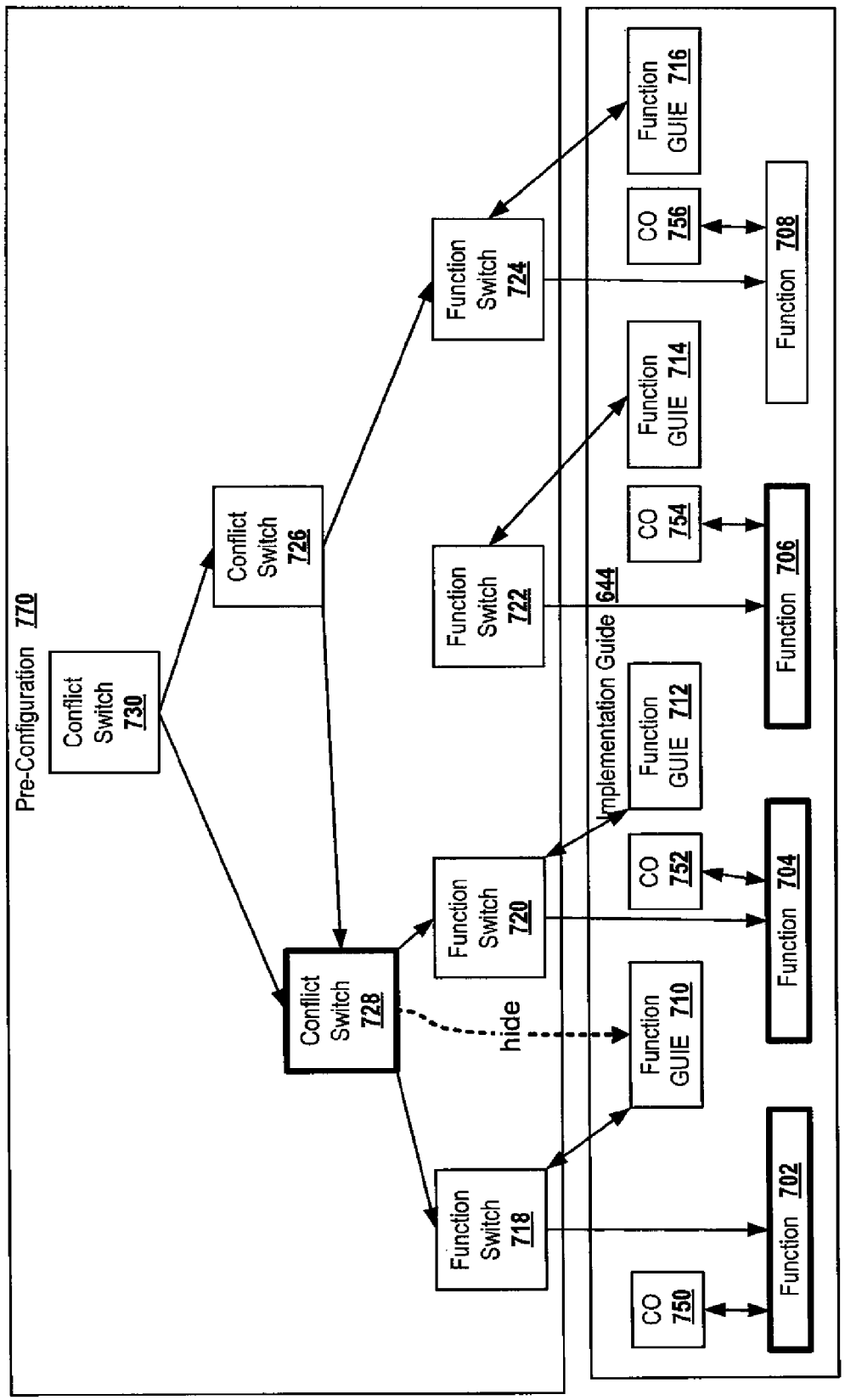
FIG. 7 illustrates an exemplary implementation guide data structure comprising conflict switches, function switches and function GUI elements.

FIG. 7 depicts an embodiment according to which the implementation guide 644 comprises four function GUI elements 710, 712, 714 and 716 respectively representing a function 702-708. Each function may be stored in association with a function switch 718, 7200, 722, 724 in the pre-configuration 770 of the enhancement package, wherein this function switch and/or conflict switches are in addition associated with one of the function GUI elements representing said function. Further, the implementation guide comprises leaf nodes in the form of computer objects CO 750, 752, 754, 756 respectively comprising computer implemented instructions for executing the assigned function. For example, CO 750 comprises instructions for executing function 702, CO 752 comprises instructions for executing function 704 and so forth. Further edges connecting the functions displayed via the implementation guide 644 with each other according to a hierarchical graph topology are not depicted in FIG. 7. The pre-configuration 770 is a data structure or data repository comprising various conflict switches 728, 726, 730 respectively having assigned one or more function switches and/or conflict switches. For example, conflict switch 730 has directly assigned the two conflict switches 728 and 726 and has not directly assigned a function or a function switch. However, conflict switch 730 is assigned to functions 702 and 704 indirectly via conflict switch 728 and via function switches 718 and 720 assigned to said conflict switch 728. In addition, the conflict switch 730 is connected to function 708 via conflict switch 726 and function switch 724. The functions 702, 704 and 706 having been selected by a user via the respective function GUI elements are depicted in FIG. 7 with a thick border line. According to the depicted selection of functions, conflict switch 728 is determined to be an active conflict switch, because all the functions assigned to that conflict switch (via the function switches 718 and 720) have been selected by the user.

According to embodiments, the assignment between function GUI elements, function switches and conflict switches as depicted in FIG. 7 is executed in a pre-configuration step by a user e.g. by means of a GUI or other pre-configuration facilities.

As conflict switches 730 and 726 have assigned the unselected function 708, conflict switches 726 and 730 are determined to be inactive conflict switches. An analysis of the active conflict switches allows for the determination that conflict switch 728 is an active conflict switch being indicative of a conflict between functions 702 and 704. This automated determination may allow the system to automatically execute program instructions resulting in the hiding of function GUI element 710 which represents one of the conflicting functions 702 when the graphical representation of the implementation guide is updated on the display device. The executed program instructions may also result in hiding, highlighting, emphasizing or otherwise modifying the display of function GUI elements to provide for a consistent and easily comprehensible view on the implementation guide. The selection of conflicting functions may thus be prohibited without having introduced any additional "parent node" in the implementation guide as known in prior art systems. Thus, the disadvantage of state-of-the-art systems using additional parent nodes making the topology of the implementation guide more complex and therefore less intelligible is avoided.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure.

The invention claimed is:

1. A computer-implemented method for process integration, the method for selecting one or more functions for display, the selection being performed via an implementation guide, wherein the implementation guide is a hierarchical data structure comprising nodes, wherein at least some of said nodes respectively represent one of said one or more functions, the method comprising:

retrieving, by a processor, in response to a user's selection of one of the one or more functions, a first list of switches, the first list of switches comprising all switches assigned to the one selected function;

extracting the switches from the first list of switches, wherein the extracted switches include at least one of function switches and conflict switches, wherein a conflict switch has at least two switches of any combination of function switches or conflict switches assigned to it and wherein each function switch is assigned to one of the one or more functions and optionally also to a conflict switch and wherein each conflict switch is assigned to at least two of the one or more functions via two of the function switches and optionally in addition via one or more of the conflict switches;

determining, for each of the extracted switches, whether the extracted switch is an active conflict switch, wherein an active conflict switch is any conflict switch whose assigned functions are currently all selected;

in case any of the extracted switches is determined to be an active conflict switch, adding the active conflict switch to a second list of switches;

after all switches in the first list of switches have either been removed from the first list or have been added to the second list of switches, processing the second list of switches for determining which of the one or more computer functions can be executed on the processor without conflicts; and as a result of the processing, presenting, by the processor, in a graphical user interface, one or more function GUI elements, each of the function GUI elements representing one of the one or more functions determined to be executable without conflicts on the processor.

2. The computer-implemented method of claim 1, wherein the retrieving comprises:

analyzing, by the processor, attributes of the selected function to identify which function switches are assigned to the selected function;

analyzing the attributes of the identified function switches to determine which of said function switches are assigned to a respective conflict switch, thereby also determining which conflict switch is assigned to the selected function;

analyzing each of the determined conflict switches to determine if any other of the conflict switches are assigned to said determined conflict switch; and adding each conflict switch having been determined in the analysis to be assigned to the selected function or to be assigned to one of the determined conflict switches to the first list of switches.

3. The computer-implemented method of claim 2, wherein the attributes are stored in a configuration data structure of an enhancement package, wherein at least some first ones of the attributes are indicative of whether and which one of the function switches are assigned to any of the functions, wherein at least some second ones of the attributes are indicative of whether and which one of the conflict switches are assigned to any of the function switches; and wherein at least some third ones of the attributes are indicative of the status of the function, said status being active if the function GUI element of said function is currently selected by the user, said status otherwise being inactive.

4. The computer-implemented method of claim 3, wherein the data content of the configuration data structure is automatically updated upon the receipt of the selection of the one function by the user if in addition the one selected function was automatically determined not to conflict with any of the other functions, wherein updating an attribute in dependence on the user's selection implies changing one of the third attributes assigned to the selected functions from inactive to active.

5. The computer-implemented method of claim 1, wherein the first list of switches is sorted before executing the extraction step, the sorting being performed in a way that conflict switches appear prior to function switches within said first list of switches.

6. The computer-implemented method of claim 1, wherein the determining whether the extracted switch is an active conflict switch comprises:
   determining if the extracted switch is a conflict switch;
   in case the extracted switch was determined to be a conflict switch, determining if said conflict switch is an active conflict switch, wherein a conflict switch is an active conflict switch when all function switches or conflict switches assigned to the extracted switch are selected;
   otherwise, determining that the extracted switch is an inactive conflict switch; and
   deleting the inactive conflict switch from the list of all switches.

7. The computer-implemented method of claim 1, wherein processing the second list of switches comprises:
   identifying, for each active conflict switch in the second list, a switch conflict resolution indicated by said active conflict switch, the switch conflict resolution being a set of program instructions for prohibiting the execution of two conflicting ones of the one or more functions; and
   executing the identified switch conflict resolution, thereby modifying the displaying of at least one of the one or more function GUI elements representing the conflicting functions.

8. The computer-implemented method of claim 7, wherein the modification comprises hiding and/or displaying function GUI elements in dependence on the result of the functions having been determined to be executable without conflicts on the processor.

9. The computer-implemented method of claim 7, further comprising updating the display of the function GUI elements upon each selection of one of the functions by the user, wherein the visibility of the updated function GUI elements depends on the result having been calculated upon said selection and being indicative of one or more conflicting functions.

10. The computer-implemented method of claim 1, wherein the user selection of one of the one or more functions comprises:
    displaying to the user the one or more function GUI elements representing the one or more functions, wherein each of said function GUI elements is a selectable GUI element;
    receiving a signal being indicative of the one function selected by the user from a selected function GUI element;
    wherein presenting the one or more function GUI elements as a result of the processing comprises updating the display of the one or more function GUI elements in dependence on the one or more functions determined to be executable without conflicts.

11. The computer-implemented method of claim 1, wherein presenting the one or more function GUI elements as a result of the processing comprises hiding at least one first and at least one second function GUI element, the at least one first GUI element representing a first one of the one or more functions, the at least one second GUI element representing a second one of the one or more functions, the first function having been determined to conflict with the second function.

12. The computer-implemented method of claim 1, the method comprising:
    evaluating each switch in the first list of switches to determine whether the switch is a conflict switch;
    for switches determined to be a conflict switch, determining whether the conflict switch is active or inactive.

13. The computer-implemented method of claim 1, wherein the nodes comprise leaf-nodes and non-leaf nodes and wherein at least some of the non-leaf nodes respectively represent one of the functions and wherein each leaf node represents computer-implemented routines operable to execute one of said functions.

14. A computer-readable non-transitory storage medium embodied with program instructions executable by a processor, the instructions causing the processor to perform a method for selecting one or more functions for display in an implementation guide according to claim 1.

15. A computer system, comprising:
    a display device for displaying a graphical user interface;
    a processor;
    a computer-readable non-transitory storage medium comprising instructions being executable by the processor, said instructions specifying
        an enhancement package configuration tool being adapted for selecting one or more functions for display, the selection being performed via an implementation guide, wherein the implementation guide is a hierarchical data structure comprising nodes, wherein at least some of said nodes respectively represent one of said one or more functions, the functions being provided by an enhancement package by:
            retrieving, by the processor, in response to a user's selection of one of the one or more functions, a first list of switches, the first list of switches comprising all switches assigned to the one selected function;
            extracting one or more individual switches from the first list of switches, wherein the extracted individual switches include at least one of function switches and conflict switches, wherein a conflict switch has at least two switches of any combination of function switches or conflict switches assigned to it and wherein each function switch is assigned to one of the one or more functions and optionally also to a conflict switch and wherein each conflict switch is assigned to at least two of the one or more functions via two of the function switches and optionally in addition via one or more of the conflict switches;
            determining, for each of the one or more extracted switches, whether the extracted switch is an active conflict switch, wherein an active conflict switch is any conflict switch whose assigned functions are currently all selected;
            in case any of the extracted switches is determined to be an active conflict switch, adding the active conflict switch to a second list of switches;
            after all switches in the first list of switches have either been removed from the first list or have been added to the second list of switches, processing the second list of switches for determining which of the one or more computer functions are to be executable on the processor without conflicts; and
            as a result of the processing, presenting, by the processor, in a graphical user interface, one or more function GUI elements, each of the function GUI elements representing one of the one or more functions determined to be executable without conflicts on the processor.

16. A computer-implemented method for process integration, the method comprising:
    retrieving, by a processor, in response to a user's selection of one of the one or more functions, a first list of switches, the first list of switches comprising all switches assigned to the one selected function;

extracting the switches from the first list of switches, wherein the extracted switches include at least one of function switches and conflict switches, wherein a conflict switch has at least two switches of any combination of function switches or conflict switches assigned to it and wherein each function switch is assigned to one of the one or more functions and optionally also to a conflict switch;

determining, for each of the extracted switches, whether the extracted switch is an active conflict switch;

in case any of the extracted switches is determined to be an active conflict switch, adding the active conflict switch to a second list of switches;

after all switches in the first list of switches have either been removed from the first list or have been added to the second list of switches, processing the second list of switches; and as a result of the processing, presenting, by the processor, in a graphical user interface (GUI), an implementation guide;

wherein the implementation guide is a hierarchical data structure comprising nodes, and at least some of the nodes respectively represent one of the one or more functions.

17. The computer-implemented method of claim 16, wherein each of the conflict switches is assigned to the at least two of the one or more function via at one of:
(a) two of the function switches and (b) one or more of the conflict switches.

18. The computer-implemented method of claim 16, wherein the active conflict switch is any conflict switch whose assigned functions are currently all selected.

19. The computer-implemented method of claim 16, wherein the second list of switches is processed for determining which of the one or more computer functions can be executed on the processor without conflicts.

20. The computer-implemented method of claim 16, wherein the GUI includes one or more function GUI elements, each of the function GUI elements representing one of the one or more functions determined to be executable without conflicts on the processor.

* * * * *